(12) United States Patent
Gusler et al.

(10) Patent No.: US 6,917,980 B1
(45) Date of Patent: Jul. 12, 2005

(54) METHOD AND APPARATUS FOR DYNAMIC MODIFICATION OF INTERNET FIREWALLS USING VARIABLY-WEIGHTED TEXT RULES

(75) Inventors: Carl Phillip Gusler, Austin, TX (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 09/735,589

(22) Filed: Dec. 12, 2000

(51) Int. Cl.[7] .......................... G06F 15/16; G06F 17/30; G06F 15/173
(52) U.S. Cl. .......................... 709/229; 709/225; 707/10
(58) Field of Search .................. 707/5, 6, 10; 709/229, 709/225, 213, 203, 219, 224, 227, 217; 713/201; 340/5.8

(56) References Cited

U.S. PATENT DOCUMENTS

| | | | | |
|---|---|---|---|---|
| 5,848,233 A | | 12/1998 | Radia et al. ............ 395/187.01 |
| 5,941,947 A | * | 8/1999 | Brown et al. ................ 709/225 |
| 5,987,480 A | * | 11/1999 | Donohue et al. ......... 715/501.1 |
| 6,012,088 A | | 1/2000 | Li et al. ...................... 709/219 |
| 6,041,355 A | * | 3/2000 | Toga .......................... 709/227 |
| 6,072,942 A | | 6/2000 | Stockwell et al. ...... 395/200.36 |
| 6,233,618 B1 | * | 5/2001 | Shannon ...................... 709/229 |
| 6,401,118 B1 | * | 6/2002 | Thomas ....................... 709/224 |
| 6,539,430 B1 | * | 3/2003 | Humes ........................ 709/225 |
| 6,675,162 B1 | * | 1/2004 | Russell-Falla et al. ......... 707/5 |
| 6,684,254 B1 | * | 1/2004 | Dutta .......................... 709/229 |
| 6,701,350 B1 | * | 3/2004 | Mitchell ...................... 709/217 |
| 2002/0038363 A1 | * | 3/2002 | MacLean ..................... 709/224 |

* cited by examiner

*Primary Examiner*—Ario Etienne
*Assistant Examiner*—Uzma Alam
(74) *Attorney, Agent, or Firm*—Duke W. Yee; David A. Mims, Jr.; Wayne P. Bailey

(57) ABSTRACT

A mechanism is provided in which dynamic rules for Internet protocol addresses which should be inaccessible from an organization are determined. Keywords are entered into a search table. A sliding scale is established for the severity and frequency of possible filtered terms. For example, a term may be awarded a point value based on the severity and frequency of the term. An organizational policy may be established based upon the total number of points per document served from an Internet protocol address or an average point value for documents served from an Internet protocol address with respect to a threshold. The length of time or number of documents permitted before a decision is reached, namely a decision interval, may be established. A reset policy may be determined to dictate what actions will be taken after the decision interval is reached.

29 Claims, 3 Drawing Sheets

METHOD AND APPARATUS FOR DYNAMIC MODIFICATION OF INTERNET FIREWALLS USING VARIABLY-WEIGHTED TEXT RULES

BACKGROUND OF THE INVENTION

1. Technical Field

The present invention relates to Internet access and, in particular, to content filtering. Still more particularly, the present invention provides a method, apparatus, and program for dynamic modification of Internet firewalls using variably-weighted text rules.

2. Description of Related Art

With the ubiquity of the Internet birthing new business models and ways of working, a variety of risks are also presented to organizations that seek to capitalize on the burgeoning e-business trend. Besides the obvious security risks of damaging or unwarranted software making its way into an organizational network, liabilities exist, particularly surrounding the download of indecent or questionable subject matter. In order to protect both its information infrastructure, as well as the professional standards expected in a workplace, companies and non-profits make frequent use of firewalls, the gateways imposed between the internal network and the outside world, i.e. the Internet.

Firewalls stand at an organization's electronic connection to the Internet and are routinely configured to allow or disallow access to sites and services based upon the nature of the services. Firewall configuration must be performed by an administrator based upon established company policies. These policies may reflect a limitation of services to e-mail, world wide web (WWW) access, and whatever else is deemed necessary to accomplish business objectives. However, given that document retrieval may include material deemed by management to be improper, human review is necessary to ensure that access complies with company policies. The content of the Internet is so dynamic that it is extremely difficult for administrators to keep up with the nature of-all registered domains.

Content filtering at the firewall requires human interaction. For example, an administrator may decide that a given Internet protocol (IP) address is serving inappropriate content and the administrator must then enter rules at the firewall which deny any further internal access to that site. An alternative to this approach may be conducted on the desktop using "fat-client" software that filters at the client machine. The latter approach is limited in scope and is seldom used in a corporate environment because of the demoralizing intrusion on the end user, as well as the logistical problems of code distribution among client machines.

Therefore, it would be advantageous to provide a solution to content filtering that does not require human intervention and manual review of content and does not impose restrictive and cumbersome desktop filtering best suited for home computers.

SUMMARY OF THE INVENTION

The present invention determines dynamic rules for Internet protocol address which should be inaccessible from an organization. Keywords are entered into a search table. A sliding scale is established, wherein a term may be awarded a point value based upon its severity. Subsequently, a keyword's frequency and point value are used to determine the acceptability of a document source. An organizational policy may be established based upon the total number of points per document served from an Internet protocol address or an average point value for documents served from an Internet protocol address with respect to a threshold. The length of time or number of documents permitted before a decision is reached, namely a decision interval, may be established. A reset policy may be determined to dictate what actions will be taken after the decision interval is reached.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
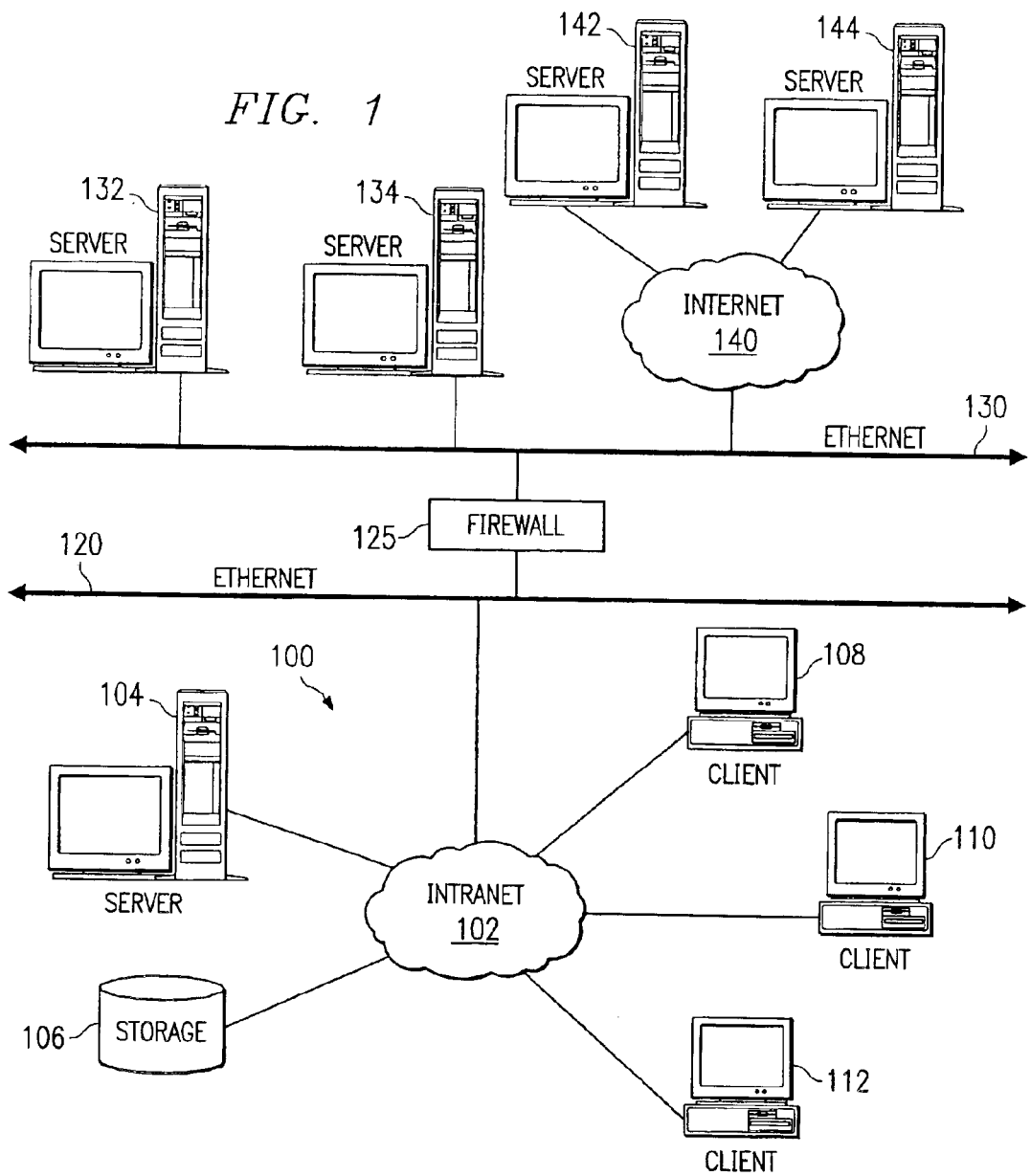
FIG. 1 depicts a pictorial representation of a network of data processing systems in which the present invention may be implemented.

With reference now to the figures, FIG. 1 depicts a pictorial representation of a network of data processing systems in which the present invention may be implemented. network data processing system 100 is a network of computers in which the present invention may be implemented. Network data processing system 100 contains an intranet 102, which is the medium used to provide communications links between various devices and computers connected together within network data processing system 100. Intranet 102 may include connections, such as wire, wireless communication links, or fiber optic cables.

In the depicted example, a server 104 is connected to intranet 102 along with storage unit 106. In addition, clients 108, 110, and 112 also are connected to intranet 102. These clients 108, 110, and 112 may be, for example, personal computers or network computers. In the depicted example, server 104 provides data, such as boot files, operating system images, and applications to clients 108–112. Clients 108, 110, and 112 are clients to server 104.

Network data processing system 100 may include additional servers, clients, and other devices not shown. Intranet 102 is connected to ethernet 120, which is connected to ethernet 130 via firewall 125. Firewall 125 provides access to outside resources, such as servers 132, 134 and Internet 140, while protecting internal resources.

Internet 140 represents a worldwide collection of networks and gateways that use the transmission control protocol/Internet protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Firewall 125 also allows clients 108, 110, 112 to access servers 142, 144 via Internet 140. The firewall may reside on a server machine or may comprise a self contained firewall appliance, as known in the art. In accordance with a preferred embodiment of the present invention, document content is used to determine dynamic rules for IP address which should be inaccessible from an organization's computers. The firewall includes a rules table for filtering content. Keywords are entered into a search table. These keywords may include sexually related terms or other desired filter parameters. Incoming content not filtered by existing rules are scanned for the identified keywords. If such keywords are found, the originating IP address is added to the firewall rules table.

Figure 2:
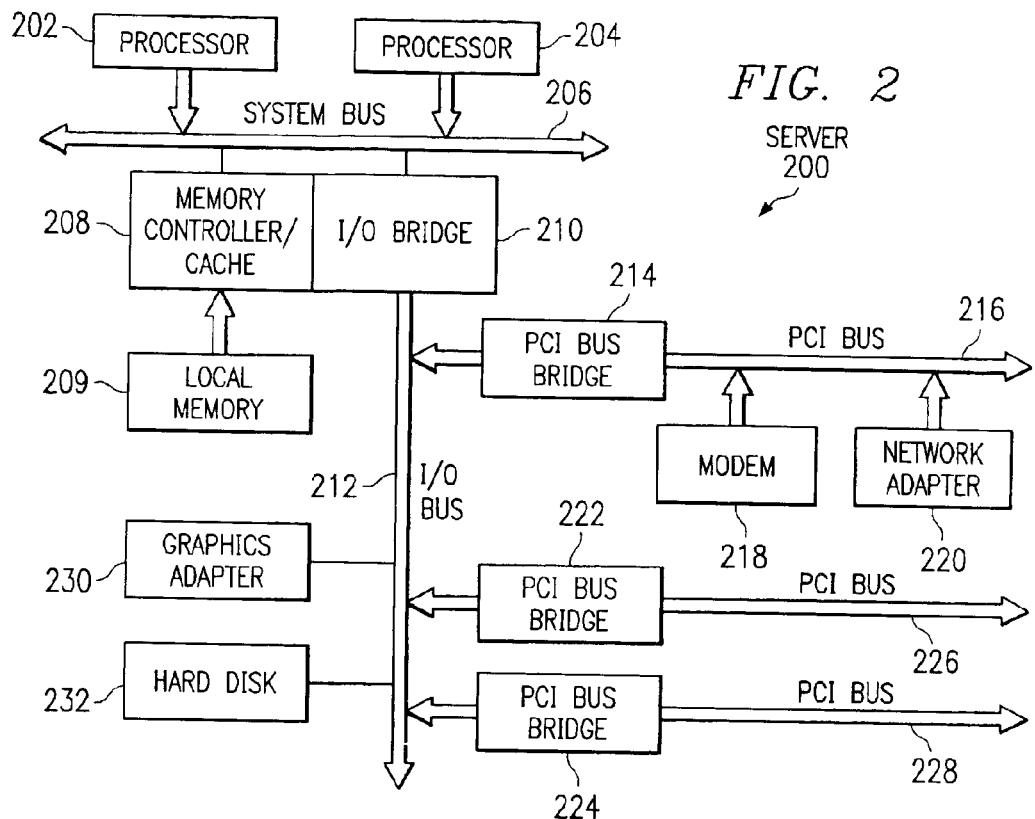
FIG. 2 is a block diagram of a data processing system that may be implemented as a server in accordance with a preferred embodiment of the present invention.

Referring to FIG. 2, a block diagram of a data processing system that may be implemented as a server, such as servers 104, 132, 134, 142, 144 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk rives and the like, also may be used in addition to or in lace of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
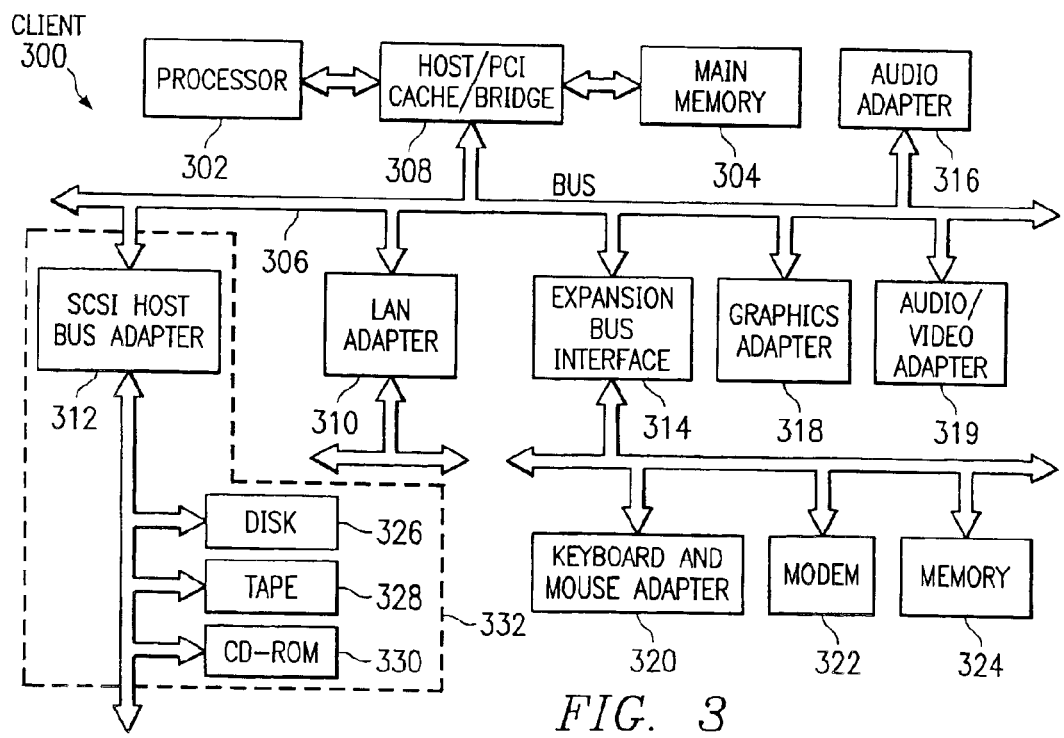
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft-Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figures 4, 5:
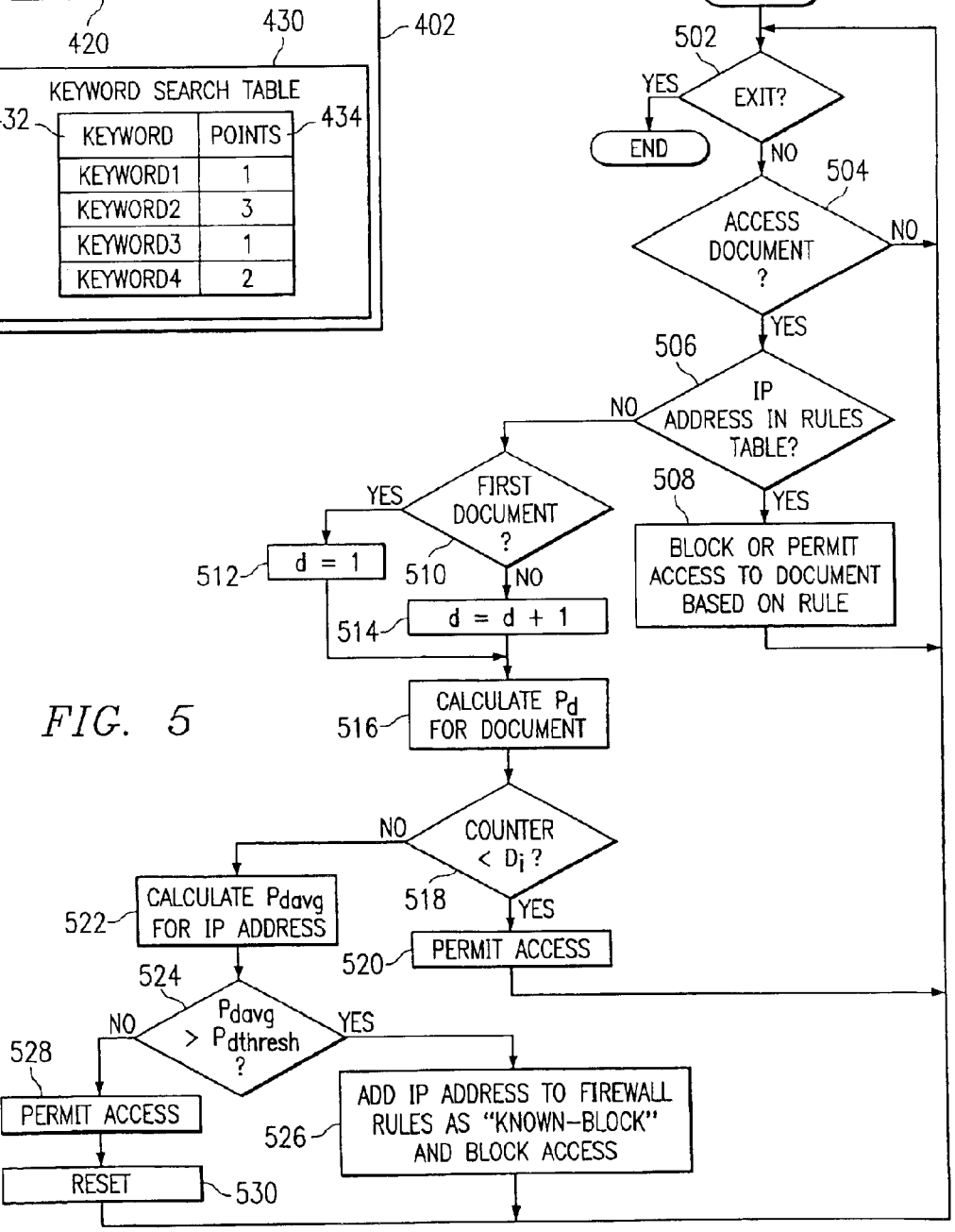
FIG. 4 is a block diagram of a firewall host in accordance with a preferred embodiment of the present invention.
FIG. 5 is a flowchart illustrating the operation of a content filtering process in accordance with a preferred embodiment of the present invention.

With respect to FIG. 4, a block diagram of a firewall host is depicted in accordance with a preferred embodiment of the present invention. Firewall host 402 includes firewall rules table 420 and keyword search table 430. When an site is identified as serving inappropriate content, the IP address of the site is added to firewall rules table 420. In the example shown in FIG. 4, the firewall rules table includes IPAddress1 422, IPAddress2 424, IPAddress3 426, and IPAddress4 428. When a document request is received from inside the firewall, the firewall host checks the IP address of the site from which the document is being served. If the IP address is in the firewall rules table, then the document access is blocked. U.S. patent application Ser. No. 09/687,100, which is hereby incorporated by reference, discloses a method and apparatus for building dynamic firewall rules based on content of downloaded documents. However, blocking an IP address based on whether keywords are found in one document might result in some sites being blocked unnecessarily and others. It would be advantageous to provide a more intelligent analysis of the source of documents, rather than a yes/no decision based on a single document.

In accordance with a preferred embodiment of the present invention, keyword search table 430 includes keywords 432 and corresponding point values 434. A sliding scale may be established for the severity and frequency of a possible filtered term. For example, a three point scale may award a term "sex" one point, because the term is deemed to be of low severity and is often used in place of the term "gender." The three point scale may also award one point to other terms having low severity, such as "sports" and "movies." However, the same three point scale may award a three point value to more severe terms, such as sexually graphic terms, obscenities, and terms suggesting violence or illegal activity.

The exemplary three point scale may also award two points to terms that are mildly inappropriate, such as religious or political terms, particularly concerning outgoing documents such as e-mail. While religious or political sites may not be considered inappropriate generally, a company may wish to prevent employees from expressing religious or political views using company resources, preferring for the employees to express these views on their own time and using their own resources.

In the example shown in FIG. 4, keywords are stored in the keyword column 432 and the point values are stored in the points column 434. In this example, keyword1 and keyword3 are awarded a point value of one, while keyword4 is awarded a point value of 2 and keyword2 is awarded a point value of 3. Thus, keyword1 and keyword3 may be terms of mild severity, such as "sex" and "sports," while keyword2 may be a term of higher severity, such as a sexually graphic term. While the examples show herein assign point values based upon a sliding scale, other techniques may also be used as known in the art of database and Internet searching. For example, proximity and boolean operators may be used to assign point values.

An organizational policy may be established based upon three criteria. The first criteria is the number of points per document served ($P_d$) or the average number of points per document served from a given IP address ($P_{davg}$) relative to a threshold ($P_{dthresh}$). The number of points per document served is a total of the number of points for each keyword in the table ($Kw_p$). This is determined by comparing the document text with the keywords-from the keyword search table.

The second criteria is the number of documents permitted before a decision is reached. This is called the decision interval ($D_i$). Alternatively, the decision may be determined as a length of time. The average number of points per document ($P_{davg}$) may be computed over the decision interval and compared to the threshold ($P_{dthresh}$). In other words, $P_{davg}$ is the sum of all the $P_d$ divided by the number of documents received from the domain. If $P_{davg}$ exceeds $P_{dthresh}$ at the end of the decision interval, then the IP address of the site serving the documents is added to the firewall rules table.

The third criteria that may be considered for an organizational policy is a reset policy. The reset policy dictates what actions may be taken after the decision interval has been reached and the site is not deemed to be inappropriate. The reset policy may be that once $D_i$ is reached with the threshold not exceeded, the site is automatically deemed to be "safe." However, the reset policy may dictate that the counter controlling the number of documents received is reset to zero and a new determination is made across the next $D_i$ documents served. Alternatively, the reset policy may extend the decision interval into a moving window with a moving average based on the last $D_i$ documents, such that a site will be evaluated upon every page served from it.

A person of ordinary skill in the art will realize that any of the above reset policies may be used within the scope of the invention. Furthermore, other reset policies may be devised. For example, the above policies may be used in combination based on a hierarchy of thresholds. Thus, if the average point value at the end of the decision interval is between zero and a first threshold the site is deemed to be safe; if the average point value is between the first threshold and a second threshold, the counter is reset to zero and the next Di documents are considered; if the average point value is between the second threshold and a third threshold, the decision interval is extended into a moving window; and, if the average point value is higher than the third threshold, the IP address is added to the firewall rules table.

As a practical example, consider an organization that enters keywords and points ($Kw_p$) into a keyword search table and assigns the following policy values: $D_i$ equals 10 pages and $P_{dthresh}$ equals 1.0. If the incoming traffic for the next ten pages from a domain yields $P_d$ values of 2, 1, 0, 0, 0, 3, 3, 1, 1, 0, then $P_{davg}$ is 1.1. Since $P_{dthresh}$ is exceeded, this domain is declared as a "known-block" and the site is automatically blocked by insertion of a new filtering rule into the firewall rules table. In contrast, if the ten pages from this domain yields $P_d$ values of 0, 1, 0, 0, 0, 1, 2, 0, 0, 0, then $P_{davg}$ is 0.4. Thus, $P_{dthresh}$ is not exceeded and, depending upon the reset policy, the serving domain may be declared as a "known-safe" source of documents and is not blocked.

If an originating site is marked as a "known-safe" or "known-block" address, then documents from this address are not filtered again. This step is included to mitigate processing requirements upon the firewall computer. If a requested document originates from a "known-safe" source, then the document is simply passed through as requested.

Turning now to FIG. 5, a flowchart is shown illustrating the operation of a content filtering process in accordance with a preferred embodiment of the present invention. The process begins and a determination is made as to whether an exit condition exists (step 502). An exit condition may exist when the firewall host is shut down or filtering is deactivated. If an exit condition exists, the process ends.

If an exit condition does not exist in step 502, a determination is made as to whether a request to access a document is received (step 504). If a request to access a document is not received, the process returns to step 502 to determine whether an exit condition exists.

If a request to access a document is received in step 504, a determination is made as to whether the IP address from which the document is served is in the firewall rules table (step 506). If the IP address is in the firewall rules table, the process blocks or permits access to the document based on the rule (step 508) and returns to step 502 to determine whether an exit condition exists. For example, if the IP address is in the firewall rules table as a "known-safe" source, then access is permitted and if the IP address is in the firewall rules table as a "known-block" source, then access is blocked.

If the IP address is not in the firewall rules table in step 506, a determination is made as to whether it is the first document received from the domain (step 510). If the document is the first document received from the IP address, the process sets the counter (d) to one (step 512) and calculates the point value ($P_d$) for the document (step 516). If the document is not the first document received from the domain in step 510, the process increments the counter (step 514) and calculates the point value ($P_d$) for the document (step 516). Next, a determination is made as to whether the decision interval is reached (step 518). If the decision interval is not reached, the process permits access (step 520) and returns to step 502 to determine whether an exit condition exists.

If the decision interval is reached in step 518, the process calculates the average point value ($P_{davg}$) for documents from the source (step 522). The average is calculated over the last $D_i$ documents. Thus, if the counter is equal to $D_i$, then the average is the total of the $P_d$ values for d being between 0 and $D_i$ divided by $D_i$. If the counter is greater than $D_i$, then the average is a moving average, which is calculated each time through the process. Next, a determination is made as to whether the threshold ($P_{dthresh}$) is exceeded (step 524). If the threshold is exceeded, the process adds the IP address to the firewall rules table as a "known-block" source and blocks access to the document (step 526). Then, the process returns to step 502 to determine whether an exit condition exists.

If the threshold is not exceeded in step 524, the process permits access (step 528) and resets the decision interval and manner in which the average is calculated (step 530). The step of resetting the decision interval may comprise declaring the source as "known-safe" and entering the IP address in the firewall rules table so that the site is not filtered again. The step of resetting the decision interval may comprise setting the counter (d) to zero. If the reset policy dictates that a moving window is to be used, then the counter is allowed to exceed the decision interval and the average is computed over only the decision interval. Thereafter, the process returns to step 502 to determine whether an exit condition exists.

The present invention solves the disadvantages of the prior art by providing an intelligent and dynamic filtering mechanism at the firewall. This mechanism allows a company to maintain control over the use of client workstations. Viewing of pornography and other inappropriate subject matter can be governed within the workplace with a minimum of human interaction. Furthermore, by dynamically modifying filtering rules when such content is detected, the firewall may block on IP address, which is less computationally intensive than scanning all content when repeated requests are received for a site serving inappropriate content.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for filtering content comprising:

assigning point values to a plurality of keywords;

receiving a first plurality of documents from a source;

comparing text of each of the first plurality of documents with the plurality of keywords;

calculating a score for cach of the first plurality of documents based on the point values and the results of the comparison;

calculating an first average of the scores for the first plurality of documents; and blocking access to the source if the first average score exceeds a threshold.

2. The method of claim 1, wherein the keywords and corresponding point values are stored in a keyword search table.

3. The method of claim 1, wherein the step of blocking access to the source comprises entering a known-block rule in a rules table, the known-block rule indicating that the source is to be blocked.

4. The method of claim 1, further comprising:

entering a known-safe rule in a rules table if the first average score does not exceed the threshold, the known-safe rule indicating that access to the source is to be permitted.

5. The method of claim 1, further comprising:

if the first average score does not exceed the threshold, performing the following steps:

receiving a second plurality of documents from a source;

comparing text of each of the second plurality of documents with the plurality of keywords;

calculating a score for each of the second plurality of documents based on the point values and the results of the comparison;

calculating an second average of the scores for the second plurality of documents; and blocking access to the source if the second avenge score exceeds a threshold.

6. The method of claim 1, wherein the method is performed in a firewall.

7. A method for filtering content, comprising:

assigning point values to a plurality of keywords;

receiving a request for a document from a client;

receiving the document from a source;

comparing text of the document with the plurality of keywords;

calculating a score for the document based on the point values and the results of the comparison;

determining if a decision interval has been reached;

calculating an average score over the decision interval if the decision interval has been reached for the source; and blocking access to the source if the average score exceeds a threshold.

8. The method of claim 7, wherein the keywords and corresponding point values are stored in a keyword search table.

9. The method of claim 7, wherein the decision interval is a length of time.

10. The method of claim 7, wherein the decision interval is a number of documents.

11. The method of claim 7, wherein the step of blocking access to the source comprises entering a known-block rule in a rules table, the known-block rule indicating that the source is to be blocked.

12. The method of claim 7, further comprising:

entering a known-safe rule in a rules table if the first average score does not exceed the threshold, the known-safe rule indicating that access to the source is to be permitted.

13. The method of claim 7, further comprising:

passing the document to the client if the decision interval has not been reached.

14. The method of claim 7, further comprising:

passing the document to the client if the first average score does not exceed the threshold.

15. An apparatus for filtering content, comprising:

assignment means for assigning point values to a plurality of keywords;

receipt means for receiving a first plurality of documents from a source;

comparison means for comparing text of each of the first plurality of documents with the plurality of keywords;

calculation means for calculating a score for each of the first plurality of documents based on the point values and the results of the comparison;

averaging means for calculating an first average of the scores for the first plurality of documents; and blocking means for blocking access to the source if the first average score exceeds a threshold.

16. The apparatus of claim 15, wherein the keywords and corresponding point values are stored in a keyword search table.

17. The apparatus of claim 15, wherein the blocking means comprises means for entering a known-block rule in a rules table, the known-block rule indicating that the source is to be blocked.

18. The apparatus of claim 15, further comprising:

means for entering a known-safe rule in a rules table if the first average score does not exceed the threshold, the known-safe rule indicating that access to the source is to be permitted.

19. The apparatus of claim 15, wherein the apparatus is in a firewall.

20. An apparatus for filtering content, comprising:

assignment means for assigning point values to a plurality of keywords;

first receipt means for receiving a request for a document from a client;

second receipt means for receiving the document from a source;

comparison means for comparing text of the document with the plurality of keywords;

calculation means for calculating a score for the document based on the point values and the results of the comparison;

determination mums for determining if a decision interval has been reached;

averaging means for calculating an average score over the decision interval if the decision interval has been reached for the source; and blocking means for blocking access to the source if the average score exceeds a threshold.

21. The apparatus of claim 20, wherein the keywords and corresponding point values are stored in a keyword search table.

22. The apparatus of claim 20, wherein the decision interval is a length of time.

23. The apparatus of claim 20, wherein the decision interval is a number of documents.

24. The apparatus of claim 20, wherein the blocking means comprises means for entering a known-block rule in a rules table, the known-block rule indicating that the source is to be blocked.

25. The apparatus of claim 20, further comprising:

means for entering a known-safe rule in a rules table if the first average score does not exceed the threshold, the known-safe rule indicating that access to the source is to be permitted.

26. The apparatus of claim 20, further comprising:

means for passing the document to the client if the decision interval has not been reached.

27. The apparatus of claim 20, further comprising:

means for passing the document to the client if the average score does not exceed the threshold.

28. A computer program product, in a computer readable medium, for filtering content, comprising:

instructions for assigning point values to a plurality of keywords;

instructions for receiving a first plurality of documents from a source;

instructions for comparing text of each of the first plurality of documents with the plurality of keywords;

instructions for calculating a score for each of the first plurality of documents based on the point values and the results of the comparison;

instructions for calculating an first average of the scores for the first plurality of documents; and instructions for blocking access to the source if the first average score exceeds a threshold.

29. A computer program product, in a computer readable medium, for filtering content, comprising:

instructions for assigning point values to a plurality of keywords;

instructions for receiving a request for a document from a client;

instructions for receiving the document from a source;

instructions for comparing text of the document with the plurality of keywords;

instructions for calculating a score for the document based on the point values and the results of the comparison;

instructions for determining if a decision interval bas been reached;

instructions for calculating an average score over the decision interval if the decision interval has been reached for the source; and instructions for blocking access to the source if the average score exceeds a threshold.

\* \* \* \* \*

UNITED STATES PATENT AND TRADEMARK OFFICE
CERTIFICATE OF CORRECTION

PATENT NO. : 6,917,980 B1  Page 1 of 1
APPLICATION NO. : 09/735589
DATED : July 12, 2005
INVENTOR(S) : Gusler et al.

It is certified that error appears in the above-identified patent and that said Letters Patent is hereby corrected as shown below:

Col. 10, line 1: before "for" delete "mums" and insert --means--.

Col. 10, line 36: after "text of" delete "cach" and insert --each--.

Signed and Sealed this

Nineteenth Day of December, 2006

JON W. DUDAS
*Director of the United States Patent and Trademark Office*